United States Patent [19]
Detwiler et al.

[11] Patent Number: 6,059,189
[45] Date of Patent: May 9, 2000

[54] DUAL APERTURE OPTICAL SCANNER

[75] Inventors: Paul O. Detwiler; Barry M. Mergenthaler, both of Lawrenceville, Ga.

[73] Assignee: NCR Corporation, Dayton, Ohio

[21] Appl. No.: 08/312,391

[22] Filed: Sep. 26, 1994

Related U.S. Application Data

[63] Continuation of application No. 08/064,292, Jul. 15, 1993, abandoned, which is a continuation of application No. 07/767,746, Sep. 30, 1991, Pat. No. 5,229,588.

[51] Int. Cl.$^7$ ................................................. G06K 7/10
[52] U.S. Cl. ................ 235/467; 235/462.01; 235/472.01
[58] Field of Search .............................. 235/467, 462.01, 235/472.01

[56] References Cited

U.S. PATENT DOCUMENTS

| | | |
|---|---|---|
| 3,774,014 | 11/1973 | Berler . |
| 3,818,444 | 6/1974 | Connell . |
| 4,018,504 | 4/1977 | Wu et al. . |
| 4,064,390 | 12/1977 | Hildebrand et al. . |
| 4,065,343 | 12/1977 | Stumpe . |
| 4,193,540 | 3/1980 | Dougados et al. . |
| 4,333,006 | 6/1982 | Gorin et al. . |
| 4,369,361 | 1/1983 | Swartz et al. . |
| 4,473,746 | 9/1984 | Edmonds . |
| 4,560,862 | 12/1985 | Eastman et al. . |

(List continued on next page.)

FOREIGN PATENT DOCUMENTS

| | | |
|---|---|---|
| 0360249 | 3/1990 | European Pat. Off. . |
| 0360250 | 3/1990 | European Pat. Off. . |
| 0412351 | 2/1991 | European Pat. Off. . |
| 0420643 | 4/1991 | European Pat. Off. . |
| 0444958 | 9/1991 | European Pat. Off. . |
| 52-002445 | 1/1977 | Japan . |
| 61-228584 | 10/1986 | Japan . |
| 63-192175 | 8/1988 | Japan . |
| 2-83681 | 3/1990 | Japan . |
| 2-83686 | 3/1990 | Japan . |
| 2-85983 | 3/1990 | Japan . |
| 3-218587 | 9/1991 | Japan . |
| 3-252889 | 11/1991 | Japan . |
| 3-252891 | 11/1991 | Japan . |
| 3-253811 | 11/1991 | Japan . |
| 3-257691 | 11/1991 | Japan . |
| 3-257692 | 11/1991 | Japan . |
| 3-265079 | 11/1991 | Japan . |
| 3-266195 | 11/1991 | Japan . |
| 3-271880 | 12/1991 | Japan . |
| 3-271987 | 12/1991 | Japan . |
| 3-271988 | 12/1991 | Japan . |
| 4-347783 | 12/1992 | Japan . |
| 1316985 | 5/1973 | United Kingdom . |

OTHER PUBLICATIONS

Hildebrand, A.P., "Generating Multi–Dimensional Scan Using A Single Rotating Component," *Laser Scanning Components & Techniques*, Proceedings of the Society of Photo–Optical Instrumentation Engineers, vol. 84, Aug. 24–25, 1976, San Diego, CA, pp. 85–89.

Inderrieden, M.T., "Human Factors Study on the Benefits of Two Scanners Per Checklane," Sep. 11, 1987.

(List continued on next page.)

*Primary Examiner*—Harold Pitts
*Attorney, Agent, or Firm*—Paul W. Martin

[57] ABSTRACT

A dual aperture optical scanner which employs a single laser beam to produce horizontal and vertical scan patterns. The optical scanner includes a housing having first and second apertures, a laser beam source, a mirrored spinner having a plurality of facets with different elevation angles for reflecting the laser beam in a plurality of directions, and a plurality of pattern mirrors within the housing for reflecting the laser beam from the spinner through the first and second apertures to an article having a bar code label to be scanned. The optical scanner also includes an optical transceiver for passing the laser beam and for collecting reflected light from the scanned article and a photodetector for generating signals representing the intensity of the light reflected from the article.

5 Claims, 6 Drawing Sheets

U.S. PATENT DOCUMENTS

| | | |
|---|---|---|
| 4,652,732 | 3/1987 | Nickl . |
| 4,671,661 | 6/1987 | Ott . |
| 4,713,532 | 12/1987 | Knowles . |
| 4,762,984 | 8/1988 | Knowles et al. . |
| 4,794,237 | 12/1988 | Ferrante . |
| 4,799,164 | 1/1989 | Hellekson et al. . |
| 4,851,667 | 7/1989 | Mergenthaler et al. . |
| 4,861,973 | 8/1989 | Hellekson et al. . |
| 4,872,062 | 10/1989 | Nanba . |
| 4,939,355 | 7/1990 | Rando et al. . |
| 4,960,985 | 10/1990 | Knowles . |
| 4,999,482 | 3/1991 | Yang . |
| 5,000,529 | 3/1991 | Katoh et al. . |
| 5,019,694 | 5/1991 | Collins, Jr. . |
| 5,025,477 | 6/1991 | Baitz et al. . |
| 5,042,619 | 8/1991 | Kohno . |
| 5,107,100 | 4/1992 | Shepard et al. . |
| 5,128,520 | 7/1992 | Rando et al. . |
| 5,148,009 | 9/1992 | Lindacher . |
| 5,206,491 | 4/1993 | Katoh et al. . |
| 5,239,169 | 8/1993 | Thomas . |
| 5,256,864 | 10/1993 | Rando et al. . |
| 5,266,788 | 11/1993 | Yamazaki et al. . |
| 5,268,565 | 12/1993 | Katoh et al. . |
| 5,272,322 | 12/1993 | Nishida et al. . |
| 5,293,033 | 3/1994 | Yamashita . |

OTHER PUBLICATIONS

Itkin, S., "Bar Code Scanners: Development and Trends," Logistics Today, vol. 9, Issue 3, May–Jun. 1990, United Kingdom, pp. 29–30—Abstract Only.

Wu, Ps. S., et al., "Omnidirectional Laser Scanner for Supermarkets," SPIE, vol. 378, Laser Scanning and Recording, 1985, pp. 458–463.

*Laser Beam Scanning*, (Gerald F. Marshall, Ed.), Marcel Dekker, Inc., New York, 1985, pp. 227–229.

DUAL APERTURE OPTICAL SCANNER

This is a continuation of application Ser. No. 08/064,292, filed on Jul. 15, 1993, now abandoned, which is a continuation of Ser. No. 07/767,746 filed on Sep. 30, 1991 now U.S. Pat. No. 5,229,588, and which designated the U.S.

BACKGROUND OF THE INVENTION

The present invention relates to optical scanners and more specifically to a dual aperture optical scanner.

Optical scanners are well known for their usefulness in retail checkout and inventory control. Optical scanners generally employ a laser diode, the light from which is focused and collimated to produce a scanning beam. An optical transceiver directs the beam against a mirrored polygon or spinner and then against a plurality of stationary mirrors, and collects the beam after it is reflected by a bar code label. A motor rotates the mirrored polygon, and a detector receives the returning beam. The pattern produced by such a scanner is characterized by lines oriented at various angles to one another.

Typically, optical scanners emit light through one aperture, either horizontal or vertical, but not both. In high performance scanners, light is emitted from several directions through this aperture. In the case of horizontal apertures, a pattern of light is projected onto the front and bottom surfaces of a labelled item. In the case of vertical apertures, a pattern of light is projected onto the front and side surfaces of a labelled item. In low performance scanners, light illuminates only the surface which is facing the aperture.

Unfortunately, scanners having one aperture require item orientation to ensure that the bar code label is properly aligned in relation to the aperture. Orientation time slows item throughput and therefore customer throughput. Item orientation may also cause repetitive strain injury.

Therefore, it would be desirable to produce a high performance optical scanner having two scanning windows which illuminate the bottom and sides of a labeled item, thereby minimizing item orientation and increasing throughput.

SUMMARY OF THE INVENTION

In accordance with the teachings of the present invention, a dual aperture optical scanner is provided. The optical scanner includes a housing having first and second apertures, a laser beam source, a mirrored spinner for reflecting the laser beam in a plurality of directions, and a plurality of pattern mirrors within the housing for reflecting the laser beam from the spinner through the first and second apertures to an article having a bar code label to be scanned. Preferably, the first aperture is substantially horizontal and the second aperture is substantially vertical to maximize scan pattern coverage and to minimize required item orientation.

The optical scanner also includes an optical transceiver for passing the laser beam and for collecting reflected light from the scanned article and a photodetector for generating signals representing the intensity of the light reflected from the article.

It is a feature of the present invention that the mirrored spinner and pattern mirrors combine to produce a plurality of scan lines which pass through the horizontal and vertical apertures. The scanner produces a scan pattern which more effectively covers multi-sided articles than single aperture scanners. The mirrored spinner includes three facets which are oriented at different angles with respect to a predetermined reference. The pattern mirrors are flat and include a first set of mirrors for reflecting the laser beam from the spinner and a second set of mirrors for reflecting the laser beam from the first set of mirrors to the article. Preferably, the optical scanner produces twenty-four scan lines.

It is accordingly an object of the present invention to provide a dual aperture optical scanner.

It is another object of the present invention to provide a dual aperture optical scanner in which a first aperture is substantially vertical and a second aperture is substantially horizontal.

It is another object of the present invention to provide a dual aperture optical scanner which maximizes the illuminated surface area of an article to be scanned.

It is another object of the present invention to provide a dual aperture optical scanner which employs a single laser and motor.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
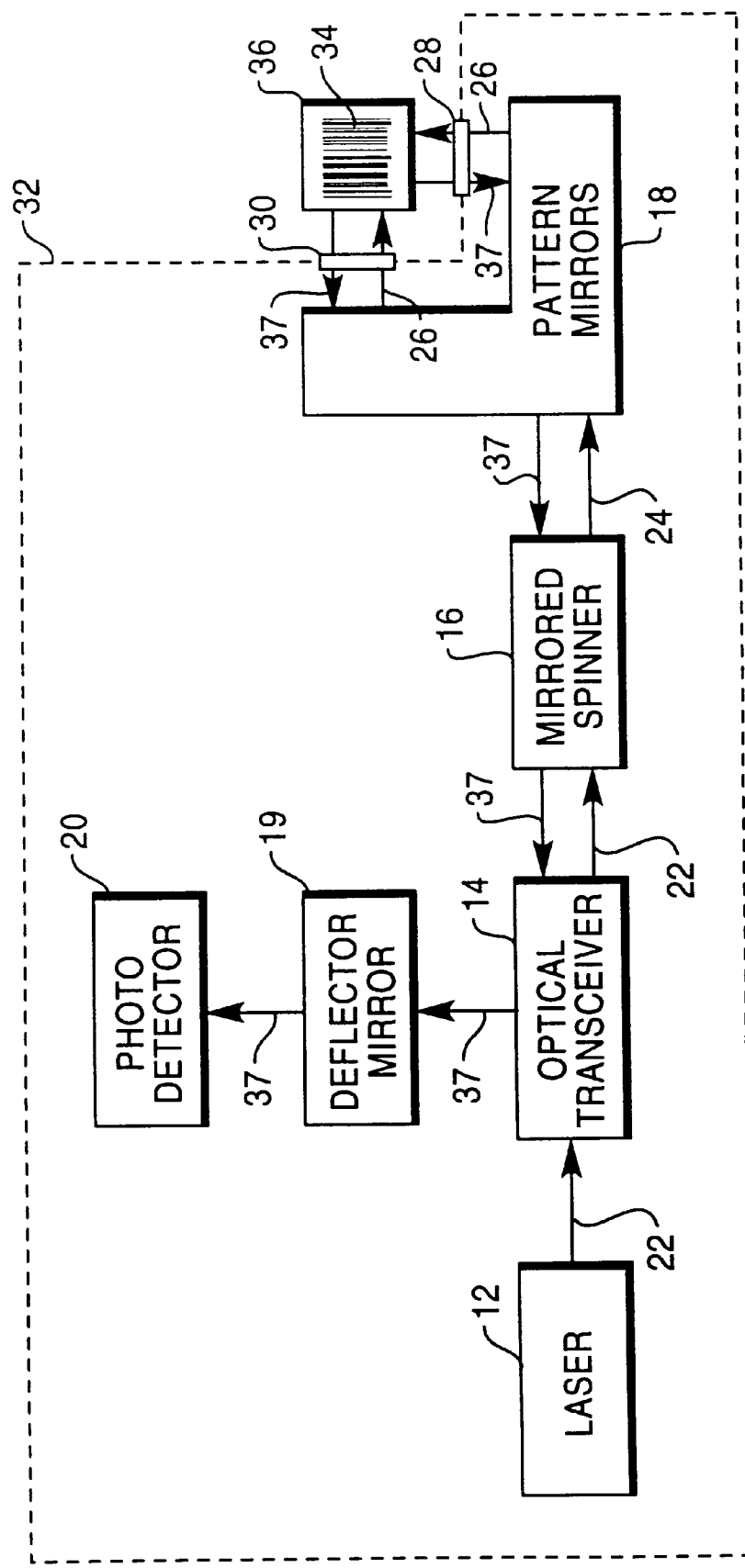
FIG. 1 is a block diagram of the dual aperture scanner of the present invention.

Referring now to FIG. 1, dual aperture optical scanner 10 of the present invention includes laser 12, optical transceiver 14, mirrored spinner 16, group 18 of pattern mirrors, deflector mirror 19, and photodetector 20. Laser 12 includes a laser diode, a focusing lens or lenses, and a collimating aperture. In the preferred embodiment, the laser diode emits visible light within a wavelength range of 670–690 nm and the collimating aperture and focusing lens produce a beam 22 having a beam waist of 220 microns in the center of the read zone.

Beam 22 passes through optical transceiver 14, which includes a mirrored collecting surface and an aperture for passing beam 22.

Beam 22 contacts mirrored spinner 16, which preferably has three planoreflective mirrored facets for producing scanning beams 24. Each facet has a slightly different elevation angle, which preferably differ by increments of about three degrees, resulting in three distinct scanning beam paths. The rotation of mirrored spinner 16 through an angle of about one-hundred-and-twenty degrees moves one facet completely through beam 22. Therefore, scanning beams 24 reflecting from mirrored spinner 16 cover an angle of about two-hundred-and-forty degrees and lie in a shallow cone.

Scanning beams 24 impact a group 18 pattern mirrors, which separate light from the facets of mirrored spinner 16 into a plurality of scan lines 26. In the preferred embodiment, group 18 of pattern mirrors split scanning beams 24 from each facet of mirrored spinner 16 into eight lines 26, resulting in twenty-four lines 26 for each complete revolution of mirrored spinner 16. Advantageously, all twenty-four lines 26 are produced by only one laser and motor.

It is a feature of scanner 10 of the present invention that some scan lines 26 pass through a substantially horizontal aperture 28 and some pass through a substantially vertical aperture 30 in scanner housing 32 on their way to bar code label 34 on article 36.

Reflected light 37 is redirected by group 18 of pattern mirrors towards spinner 16, which further directs it towards optical transceiver 14. Optical transceiver 14 directs and focuses reflected light 37 at deflector mirror 19, which further directs reflected light 37 towards photodetector 20. Photodetector 20 generates electrical signals representing the intensity of light 37.

Figure 2:
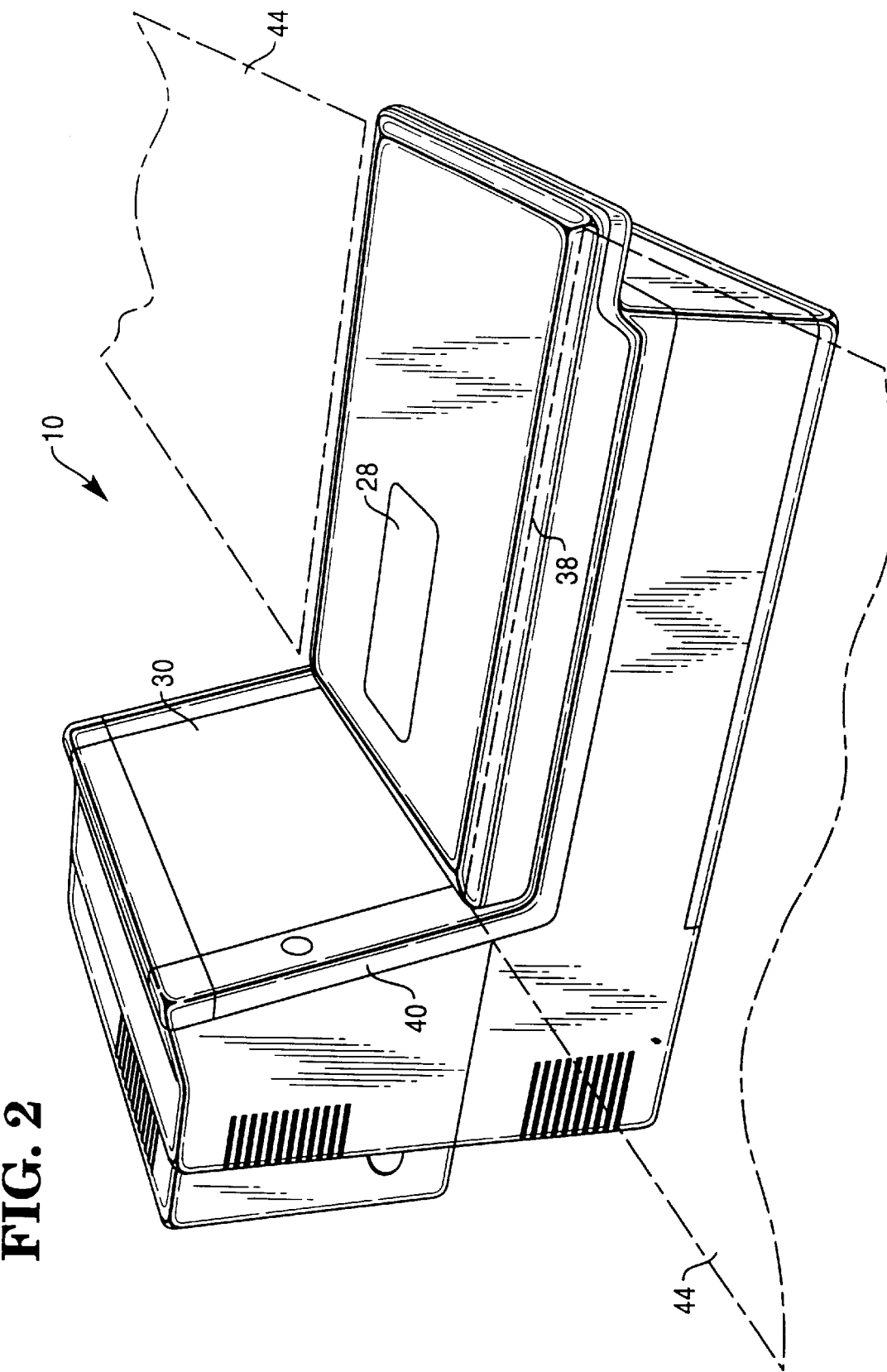
FIG. 2 is a exterior perspective view of the dual aperture scanner of the present invention.

Turning now to FIG. 2, apertures 28 and 30 are shown in more detail. Vertical aperture 30 is located within substantially vertical surface 40 and is large enough to illuminate a normal size item.

Horizontal aperture 28 is located within top surface 38 of housing 32 and is large enough to illuminate a normal size item. In this embodiment, vertical aperture 30 is larger than horizontal aperture 28.

Preferably, scanner 10 may be easily adapted to fit in a typical checkout counter 42. It is envisioned that top surface 38 be made substantially flush with the top surface 44 of counter 42.

Figure 3:
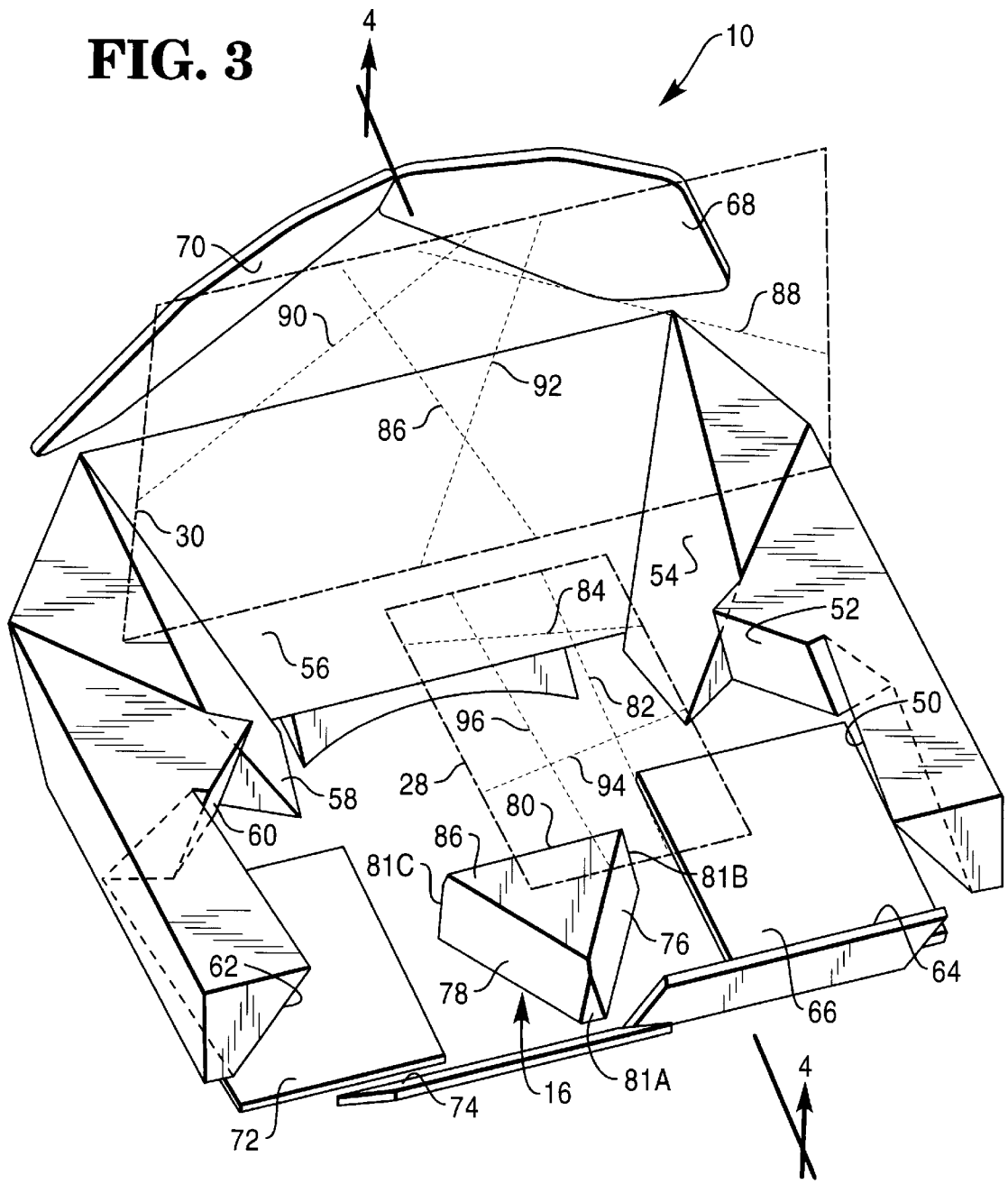
FIG. 3 is a interior perspective view of the dual aperture scanner of the present invention.
Figure 4:
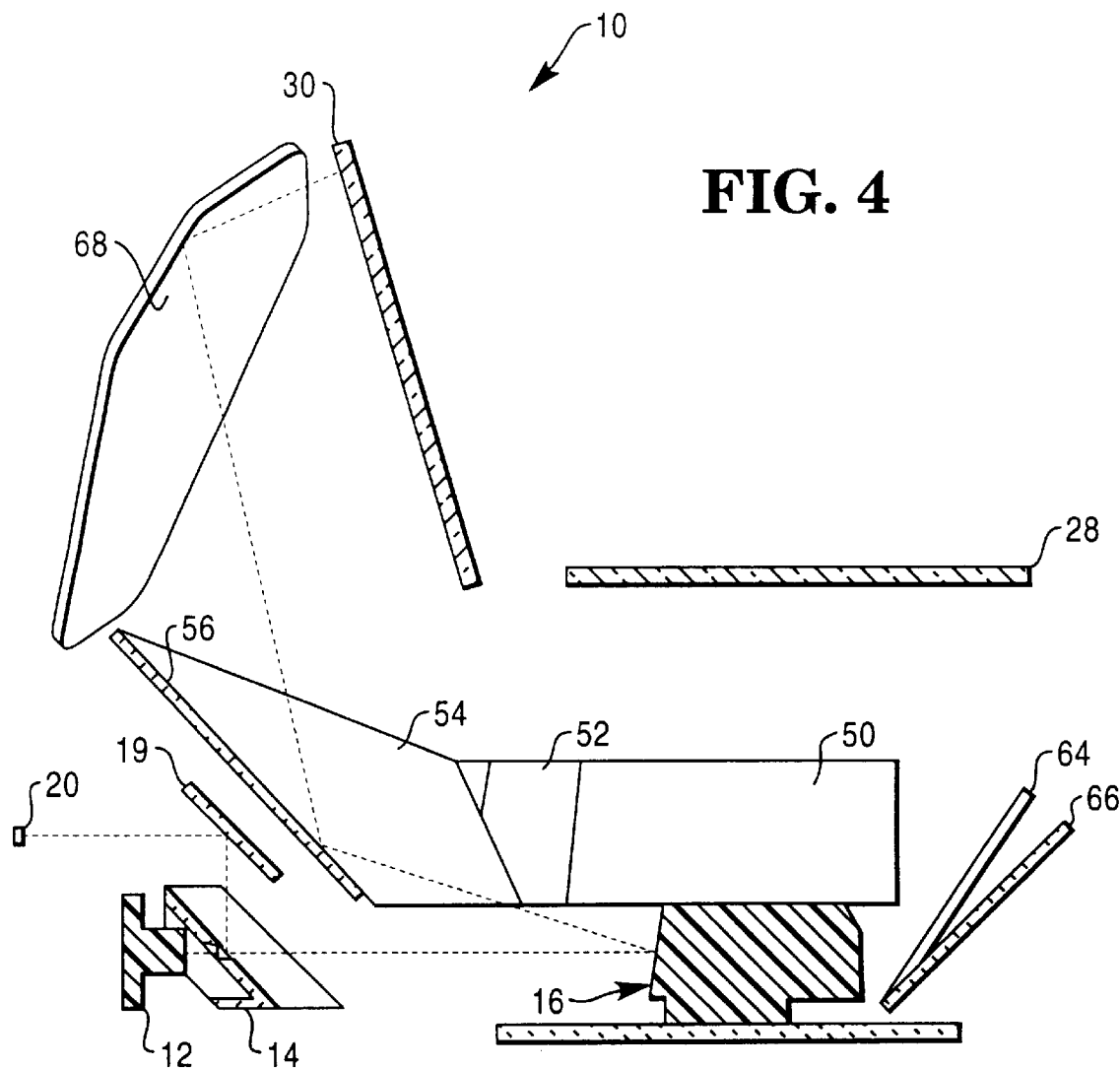
FIG. 4 is a sectional view of the dual aperture scanner of the present invention along lines 4—4 of FIG. 3.

Referring now to FIGS. 3 and 4, the arrangement of group 18 of pattern mirrors is shown in more detail. The pattern mirrors of group 18 are all flat mirrors. Scanning beams 24 from spinner 16 impact a first set of pattern mirrors 50–62 in group 18 in sequence and reflect therefrom to a second set of pattern mirrors 64–74 of group 18.

Figure 5A:
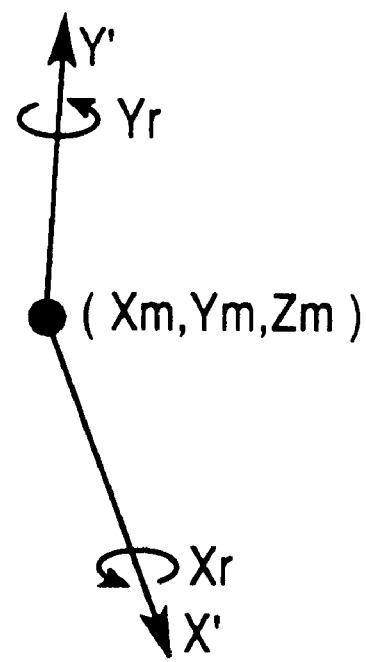
FIG. 5 is a view of a reference coordinate system for determining the location and orientation of a group of pattern mirrors within the dual aperture scanner of the present invention.
Figure 5B:
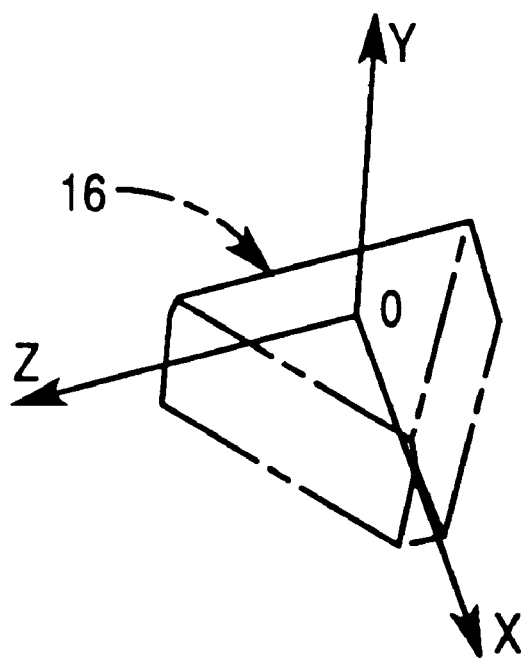
Figure 7:
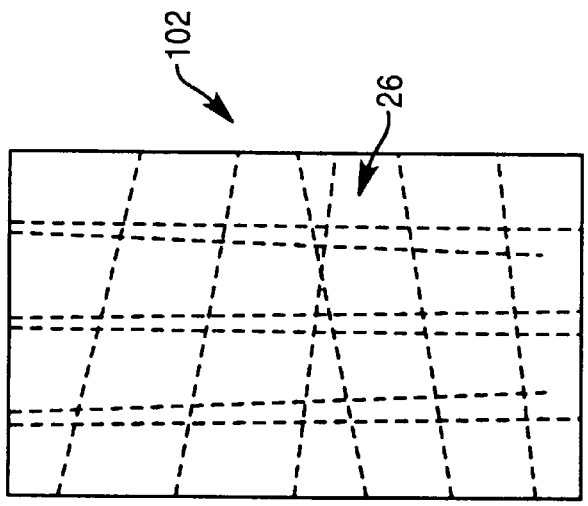
FIG. 7 is a plan view of the scan pattern emanating from a second aperture.

The reference coordinate system for pattern mirrors 50–74 is shown in FIG. 5 and includes X, Y, and Z axes. Coordinates Xm, Ym, and Zm are measured in inches, and angles Xr and Yr, are measured in degrees, with positive angles being measured in a counter-clockwise direction. To get to its final orientation, each mirror is first oriented parallel to the X-Y plane through a point (Xm, Ym, Zm). Each mirror is then rotated through an angle Xr about a line X' parallel to the X axis and containing the point (Xm, Ym, Zm). Each mirror is then rotated through an angle Yr about a line Y' parallel to the Y axis and containing the point (Xm, Ym, Zm). Origin O is at the center of spinner 16. These five values uniquely define the planes for mirrors 50–74. Preferred values are shown for each mirror in the following table:

| Mirror | Xm | Ym | Zm | Xr | Yr |
|---|---|---|---|---|---|
| 50 | −1.200 | 0.500 | −5.302 | 33.0 | −5.0 |
| 52 | −1.353 | 0.500 | −4.774 | 15.0 | 41.0 |

-continued

| Mirror | Xm | Ym | Zm | Xr | Yr |
|---|---|---|---|---|---|
| 54 | −3.575 | 0.650 | −2.393 | −35.0 | 10.0 |
| 56 | −3.575 | 0.650 | 0.000 | −42.5 | 90.0 |
| 58 | −3.575 | 0.650 | 2.393 | −35.0 | 170.0 |
| 60 | −1.353 | 0.500 | 4.774 | 15.0 | 139.0 |
| 62 | −1.200 | 0.500 | 5.302 | 33.0 | −175.0 |
| 64 | 1.800 | −0.525 | −0.412 | −33.0 | −90.0 |
| 66 | 1.800 | −0.525 | −2.000 | −86.5 | 90.0 |
| 68 | −4.990 | 8.840 | 0.000 | 28.0 | 69.0 |
| 70 | −4.990 | 8.840 | 0.000 | 28.0 | 111.0 |
| 72 | 1.800 | −0.525 | 2.000 | −86.5 | 90.0 |
| 74 | 1.800 | −0.525 | −0.338 | −44.6 | −90.0 |

Beam 22 contacts planoreflective surfaces 76–80 of mirrored spinner 16. Each facet has a slightly different elevation angle, resulting in three distinct scanning beam paths. In the preferred embodiment, the elevation angles in degrees are 76.95, 79.00, and 81.05.

At the junction of the facets are interface surfaces 81A, B, and C, produced by rounding the edges between adjacent facets. In addition, the edges are cut back further at the bottom of spinner 16. Rounding serves to reduce the torque requirements for rotating spinner 16. At high motor operating speeds, wind resistance is a dominant component of motor torque. Thus, rounding serves to markedly reduce motor torque requirements, thereby facilitating the use of smaller and less expensive motors. Additionally, it reduces power consumption and heat dissipation.

In operation, laser beam 22 strikes each facet of mirrored spinner 16 in sequence. During the illumination of each facet, scanning beams 24 impact pattern mirrors 50–62 in sequence. First, light reflects from mirror 50 and then from mirror 66 to form scan line 82.

Second, light reflects from mirror 52 and then from mirror 64 as scan line 84.

Third, light reflects from mirror 54 and then from mirror 68 as scan line 86.

Fourth, light reflects from mirror 56 and then from mirror 68 as scan line 88.

Fifth, light reflects from mirror 56 and then from mirror 70 as scan line 90.

Sixth, light reflects from mirror 58 and then from mirror 70 as scan line 92.

Seventh, light reflects from mirror 60 and then from mirror 74 as scan line 94.

Eighth, light reflects from mirror 62 and then from mirror 72 as scan line 96.

The eight-step sequence above repeats itself for the two remaining spinner facets, yielding a total of twenty-four different scan lines 26.

Figure 6:
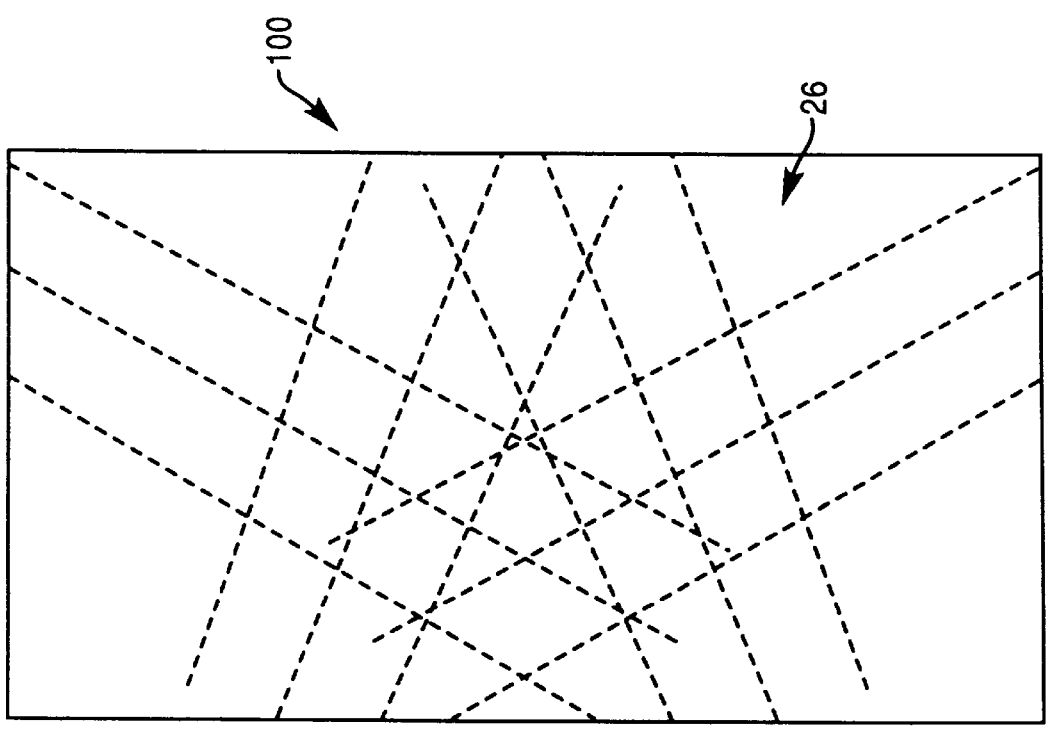
FIG. 6 is a plan view of the scan pattern emanating from a first aperture.

Referring now to FIGS. 5 and 6, vertical horizontal and scan patterns 100 and 102 are shown, including the eight scan lines of FIG. 3. Since each of the three facets of mirrored spinner 16 are inclined at different angles from one another, twenty-four different scan lines 26 are produced.

Although the invention has been described with particular reference to certain preferred embodiments thereof, variations and modifications of the present invention can be effected within the spirit and scope of the following claims.

We claim:

1. A bar code scanning system comprising
a housing having a first window and a second window arranged generally orthogonally to one another;

a first set of pattern mirrors positioned adjacent the first window;

a second set of pattern mirrors positioned adjacent the second window;

a laser beam source within the housing; and a single scanning means within the housing comprising a mirror polygon;

a motor for rotating the mirror polygon;

wherein said mirror polygon reflects a first group of scanning beams across the first set of pattern mirrors and out the first window and reflects a second group of scanning beams across the second set of pattern mirrors and out the second window.

2. An optical scanner comprising:

a housing having a first surface containing a first aperture and a second surface different from the first surface containing a second aperture;

a single laser beam source within the housing;

a polygon spinner having mirrored facets for reflecting the laser beam in a plurality of directions to produce a plurality of scanning beams including a first group of scanning beams and a second group of scanning beams; and a plurality of pattern mirrors, including a plurality of pairs of pattern mirrors, for reflecting the first group of scanning beams through the first aperture to produce a first scan pattern including a plurality of intersecting scan lines, and for reflecting the second group of scanning beams through the second aperture to produce a second scan pattern including a plurality of intersecting scan lines.

3. An optical scanner comprising:

a housing having a first surface containing a first aperture and a second surface different from the first surface containing a second aperture;

a single laser beam source within the housing;

a single polygon spinner having at least three mirrored facets for reflecting the laser beam in a plurality of directions to produce a plurality of scanning beams including a first group of scanning beams and a second group of scanning beams which produce first and second scan patterns, each including a plurality of intersecting scan lines.

4. The optical scanner as recited in claim 3, further comprising:

a plurality of pattern mirrors, including a plurality of pairs of pattern mirrors, for reflecting the first group of scanning beams from the spinner through the first aperture to produce the first scan pattern, and for reflecting the second group of scanning beams from the spinner through the second aperture to produce the second scan pattern.

5. An optical scanner comprising:

a housing having a first surface containing a first aperture and a second surface different from the first surface containing a second aperture;

a laser beam source within the housing;

a polygon spinner having at least three mirrored facets for reflecting the laser beam in a plurality of directions to produce a plurality of scanning beams including a first group of scanning beams and a second group of scanning beams; and a plurality of pattern mirrors, including a plurality of pairs of pattern mirrors, for reflecting the first group of scanning beams through the first aperture to produce a first scan pattern including a plurality of intersecting scan lines, and for reflecting the second group of scanning beams through the second aperture to produce a second scan pattern including a plurality of intersecting scan lines;

wherein the laser beam contacts each pattern mirror as the spinner revolves.

* * * * *